US006613418B2

(12) United States Patent
Tachikawa et al.

(10) Patent No.: US 6,613,418 B2
(45) Date of Patent: Sep. 2, 2003

(54) INK-JET RECORDING MATERIAL AND USE OF THE SAME

(75) Inventors: Masashi Tachikawa, Tokyo (JP); Satoshi Kaneko, Tokyo (JP)

(73) Assignee: Mitsubishi Paper Mills Limited, Tokyo (JP)

(*) Notice: Subject to any disclaimer, the term of this patent is extended or adjusted under 35 U.S.C. 154(b) by 0 days.

(21) Appl. No.: 09/867,590

(22) Filed: May 31, 2001

(65) Prior Publication Data

US 2002/0071018 A1 Jun. 13, 2002

(30) Foreign Application Priority Data

Jun. 6, 2000 (JP) ....................................... 2000-168668
Jul. 25, 2000 (JP) ....................................... 2000-223303

(51) Int. Cl.$^7$ ............................ B32B 27/14; B32B 3/00
(52) U.S. Cl. ....................... 428/195; 428/323; 428/328; 428/331
(58) Field of Search ................................ 428/195, 323, 428/328, 331

(56) References Cited

U.S. PATENT DOCUMENTS 6,228,475 B1 * 5/2001 Chu et al.
6,245,422 B1 * 6/2001 Onishi et al. ............... 428/331
6,391,427 B1 * 5/2002 Shaw-Klein et al. ........ 428/195

OTHER PUBLICATIONS

Japanese Industrial Standard, K 7105, 1981.
Japanese Industrial Standard, K 7105, 1981.
Japanese Industrial Standard, H 8686–2, 1999.

* cited by examiner

*Primary Examiner*—Cynthia H. Kelly
*Assistant Examiner*—B. Shewareged
(74) *Attorney, Agent, or Firm*—Paul E. White, Jr.; Manelli Denison & Selter PLLC

(57) ABSTRACT

An ink-jet recording material for back lit use having a light transmitting support and an ink-receptive layer provided on the support, wherein the ink-receptive layer comprises a hydrophilic polymer and an inorganic pigment having an average particle diameter of 0.5 to 10 $\mu$m, or it comprises an inorganic fine particles having an average primary particle diameter of 3 to 50 nm and an average secondary particle diameter of less than 0.5 $\mu$m, a hydrophilic polymer and an inorganic pigment having an average particle diameter of 0.5 to 10 $\mu$m, and a Haze value of the ink receptive layer defined by JIS-K-7105 is 25% or less and an image clarity C value of a surface of the ink receptive layer defined by JIS-H-8686 is 85% or less, and relates to a use thereof, preferably, a contact angle of a surface of the ink-jet recording material for a back lit use with water is 13 to 35° while one with linseed oil is 8 to 20°.

19 Claims, No Drawings

INK-JET RECORDING MATERIAL AND USE OF THE SAME

BACKGROUND OF THE INVENTION

1. Field of the Invention

The present invention relates to an ink-jet recording material for a backlit use, particularly as a medical use, to an ink-jet recording material for a backlit use which is excellent in ink-absorption property and transparency, having a sufficient transmittance even in a use of back-lighting system in which an image is directly observed by a transmitted light from the opposite side of the printing surface and is free from such a problem that an image is hard to be observed due to a reflection (back light) of outside light that is not the transmitted light. Moreover, it relates to an ink-jet recording material for a backlit use excellent in fingerprint resistance.

2. Prior Art

As a recording material to be used for an ink-jet recording method, it has been known a recording material which comprises an ink-receptive layer made of a hydrophilic polymer or a porous ink-receptive layer containing a pigment such as amorphous silica, etc. and a hydrophilic polymer, being provided on a support such as a usual paper or the so-called ink-jet recording sheet.

There have been proposed recording sheets obtained by coating a hydrophilic polymer such as starch, polyvinyl alcohol, etc. onto a support as disclosed in, for example, Japanese Provisional Patent Publications No. 080489/1981, No. 174381/1984, No. 220750/1985, No. 32788/1986, No. 160875/1988, No. 69388/1991, and the like.

There have been proposed recording sheets obtained by coating a silicon-containing pigment such as silica, etc. and an alumina sol, with an aqueous binder onto a paper support as disclosed in, for example, Japanese Provisional Patent Publications Nos. 51583/1980, 157/1981, 107879/1982, 107880/1982, 230787/1984, 160277/1987, 184879/1987, 183382/1987, 11877/1989, 21508/1991, 67986/1992 and the like.

Also, in Japanese Patent Publication No. 56552/1991, Japanese Provisional Patent Publications Nos. 188287/1990, 132728/1996, 81064/1998, 119423/1998, 175365/1998, 203006/1998, 217601/1998, 20300/1999, 20306/1999 and 34481/1999, and the like, there have been disclosed ink-jet recording materials using synthetic silica fine particles prepared by a gas phase process (hereinafter referred to as "fumed silica").

On the other hand, there has been an attempt to produce a film for a medical use by the ink-jet recording method. For those recording sheets, ink-absorption property or transparency is a matter of importance, and in addition, in a medical use where back lighting system is used in which an image is observed by a transmitted light from the opposite side of the printing surface, properties such as an fingerprint resistance and surface glare resistance against a back light are of importance. That is, a problem resides in a difficulty of observation due to surface glare or a stain due to fingerprints during handling. Fingerprint resistance is a property that is not significant in case of using a non-transparent or opaque support but is evident in case of using a light transmitting support. In Japanese provisional Patent Publication No. 276789/1995, there has been disclosed a recording material with a high ink-absorption property and high transparency, comprising a transparent support and provided thereon, a coloring agent receptive layer in which a weight ratio of silica fine particles having an average primary particle size of 10 nm or less and a water soluble polymer is 1.5:1 to 10:1. However, there is no description regarding improvement in surface glare or fingerprint resistance.

In Japanese Provisional Patent Publication No. 237682/1986, there has been proposed that fingerprint resistance is improved by adsorbing a hydrophobic material onto a surface, but there is a defect that printing property is lowered. There has been proposed in Japanese Provisional Patent Publication No. 157286/1998 to improve water resistance and fingerprint resistance by using polyvinyl alcohol with a saponification degree of 78 to 92 mol % and a polymerization degree of 1700 or more and an acrylic emulsion, however, in order to have a sufficient fingerprint resistance, lowering in ink-absorption property and bleeding of ink cannot be avoided, and there was no description regarding improvement in surface glare.

SUMMARY OF THE INVENTION

An object of the present invention is to provide an ink-jet recording material for a backlit use which has high ink-absorption property and high transparency, is excellent in image-reproducing property, particularly in a medical field where it is free from difficulty in observing images due to reflection of outside light when it is used in a back-lighting system in which an image is directly observed by a transmitted light from the opposite side of the printing surface. Further, it is to provide an ink-jet recording material for a backlit use that is excellent in fingerprint resistance.

As a result of extensive and intensive studies, the above objects of the present invention can be accomplished by the means as mentioned below.

(1) An ink-jet recording material for a back lit use having a light transmitting support and an ink-receptive layer provided on the support, wherein the ink-receptive layer comprises a hydrophilic polymer and an inorganic pigment having an average particle diameter of 0.5 to 10 $\mu$m, a Haze value of the ink receptive layer defined by JIS-K-7105 is 25% or less and an image clarity C value of a surface of the ink receptive layer defined by JIS-H-8686 is 85% or less.

(2) An ink-jet recording material for a back lit use having a light transmitting support and an ink-receptive layer provided on the support, wherein the ink-receptive layer comprises inorganic fine particles having an average primary particle diameter of 3 to 50 nm and an average secondary particle diameter of less than 0.5 $\mu$m, a hydrophilic polymer and an inorganic pigment having an average particle diameter of 0.5 to 10 $\mu$m, a Haze value of the ink receptive layer defined by JIS-K-7105 is 25% or less and an image clarity C value of a surface of the ink receptive layer defined by JIS-H-8686 is 85 % or less.

(3) An ink-jet recording material for a back lit use described in either (1) or (2), wherein a contact angle of the surface of the ink-jet recording material for a back lit use with water is 13 to 35°, and a contact angle with linseed oil is 8 to 20°.

DESCRIPTION OF THE PREFERRED EMBODIMENTS

In the following, the embodiments of the present invention are explained in detail.

According to the preferred embodiments of the present invention, for the ink-receptive layer coated on the light transmitting support, there are a case where it comprises a hydrophilic polymer, an inorganic pigment with an average particle diameter of 0.5 μm or more and optionally containing a cationic polymer and a hardening agent (hereinafter referred to as a swelling-type ink-receptive layer) and a case where it comprises inorganic fine particles with an average particle diameter of the secondary particles is less than 0.5 μm, an inorganic pigment with an average particle diameter of 0.5 μm or more and a hydrophilic polymer and optionally containing a cross-linking agent, a cationic polymer, a surfactant and the like (hereinafter referred to as a void-type ink-receptive layer). A coating solution of the ink-receptive layer is so coated that a coated layer is formed with a thickness of several tens to several hundreds of μm, and then it is subjected to drying. In a preferred example of the production method, the ink-receptive layer coated on the light transmitting support is once cooled down in an atmosphere of 20° C. or lower, then dried in a drying process.

The coating solution for the ink-receptive layer before coating is generally kept at a temperature of about 30 to 50° C., and by once cooling down after being coated, it gives a high transparency.

In a general comparison between the swelling-type ink-receptive layer and the void-type ink-receptive layer, the former has high glossiness, while its surface tends to have surface glare and it is inferior in ink-absorption property and fingerprint resistance. Especially when it is used in a medical field, the ink-absorption property is a matter of importance since an image printed by an ink-jet recording method should sufficiently reproduce the actual image. In addition, fingerprint resistance is also a matter of importance when evaluation and judgment are made using the printed image, since stain due to fingerprints make it difficult to observe those images. The increased surface glare caused by a back light of the outside light is not preferable since it makes it hard to observe an image when it is used in a back lighting system where an image is directly observed from a printed surface by irradiating light from the opposite side of the printing surface. From the above, with regard to a medical use where the back lighting system is employed, the void-type ink-receptive layer is more preferable although it has not attained a sufficient level for a practical use.

In the present invention, as the hydrophilic polymer to be used in case of the swelling-type ink-receptive layer, there may be mentioned gelatin, polyvinyl alcohol, polyvinyl pyrrolidone, polyvinyl pyridinium halide, polyacrylamide, sodium poly-acrylate, starch, carboxylated starch, cation starch, dialdehyde starch, casein, ethyl cellulose, carboxymethyl cellulose, polyethylene glycol, polypropylene glycol, styrene-maleic anhydride copolymer, and modified substances thereof, etc.

As the inorganic pigment to be used in the present invention having an average particle diameter of 0.5 μm or more, there may be mentioned light calcium carbonate, heavy calcium carbonate, magnesium carbonate, kaoline, titanium dioxide, zinc oxide, zinc hydroxide, calcium silicate, magnesium silicate, synthesized silica, alumina, alumina hydrate, aluminum oxide, magnesium hydroxide and the like. Preferably, synthesized silica and particularly silica prepared by the wet process is selected since it has an effect of improving the ink-absorption property and lowering surface glare. When the average particle diameter is smaller than 0.5 μm, there cannot be expected to obtain an effect of lowering the backlight due to reflection. Preferably, the average particle diameter is larger than 1 μm to lower the surface glare. Although there is no upper limit for the average particle diameter, with an increase of the average particle diameter, surface roughness of the ink-receptive layer increases, thereby making a feeling less smooth when printing is repeated and causing an unpleasant touch. Therefore, it is generally preferable to be 10 μm or less. The average particle diameter of the inorganic pigment means an average particle diameter of the secondary particles when they are used in a state of the secondary particles. In the present invention, a content of the inorganic pigment with the average particle diameter of 0.5 μm or more is generally 0.1 to 5 $g/m^2$ in a unit area of the recording material, although it is limited by a Haze value or a surface glare. Preferably, it is contained in an amount of 0.1 to 2 $g/m^2$.

In the present invention, as the inorganic fine particles to be used for the void-type ink-receptive layer, having an average particle diameter of the secondary particles of less than 0.5 μm, there may be mentioned light calcium carbonate, heavy calcium carbonate, magnesium carbonate, kaoline, titanium dioxide, zinc oxide, zinc hydroxide, calcium silicate, magnesium silicate, synthesized silica, alumina, alumina hydrate, aluminum oxide, magnesium hydroxide and the like, as similar to the inorganic pigment with a size of 0.5 μm or more. Of these, the synthesized silica, alumina and alumina hydrate are selected in terms of high printing density, clearness of image and low production cost. The average particle diameter of the primary particles is preferably about 3 to 50 nm in terms of transparency of the ink-receptive layer and reproducibility of the printed image. Especially in the medical use, the average particle diameter of the inorganic fine particles to be used is preferably small, since accurate reproducibility of the printed image is highly required.

In synthesized silica, there are two types of materials, one (precipitated silica) of which is prepared by the wet process and the other (fumed silica) is prepared by the gas phase process. Usual silica fine particles mean those prepared by the wet process in many cases. As the silica prepared by the wet process, there are (1) a silica sol obtained by metathesis of sodium silicate by an acid or passing through an ion exchange resin layer; (2) a colloidal silica obtained by heating and maturing the silica sol of (1); (3) a silica gel obtained by gelling silica sol in which formation conditions thereof are changed whereby primary particles of a silica gel having a diameter of several μm to 10 μm are siloxane bonded to form three-dimensional secondary particles; and (4) a synthetic silicic acid compound mainly comprising silicic acid obtained by heating silica sol, sodium silicate, sodium aluminate, etc.

Fumed silica to be used in the present invention is also called to as the drying method silica, and the fumed silica can be generally prepared by a flame hydrolysis method. More specifically, it has been known a method in which silicon tetrachloride is burned with hydrogen and oxygen. In this method, silanes such as methyl trichlorosilane, trichloro-silane, etc., may be used alone in place of silicon tetra-chloride or in combination with silicon tetrachloride. The fumed silica is commercially available from Nippon Aerosil K. K. (Japan) under the trade name of Aerosil, and K. K. Tokuyama (Japan) under the trade name of QS type, etc.

An average primary particle size of the fumed silica to be preferably used in the present invention is 3 nm to 30 nm in terms of transparency and surface gloss, however, the size of this range tends to allow a surface glare due to outside light.

Especially, when at least one kind of silica selected from a monodispersed silica A having an average particle diameter of the primary particles of 3 nm to less than 10 nm and a degree of dispersion of 1 or less, and at least one kind of silica selected from a monodispersed silica B having an average particle diameter of the primary particles of 10 nm to 30 nm and a degree of dispersion of 1 or less, are used in combination, transparency and ink-absorption property of the ink-receptive layer are improved. It is preferable when difference between the largest average particle diameter of the primary particles belonging to the fumed silica A and the smallest particle size of the primary particles belonging to the fumed silica B is 2 nm or more, in order to take a synergistic effect of using them in combination.

In the present invention, the average particle diameter of the primary particle and a standard deviation thereof are obtained from an observation by an electron microscope where the particles are dispersed sufficiently enough for being identified, and for each of 100 particles existing in a predetermined area, a diameter of a circle whose area is equivalent to a projected area of each particle is taken as a particle diameter for that particle. For the secondary particles, too, the particles dispersed by a mild shear force are observed by an electron microscope and the average particle diameter thereof is calculated in the same manner. Degree of dispersion is obtained as a ratio of standard deviation/average particle diameter, and the smaller value means the fewer particles deviating from the average particle diameter, exhibiting a high monodispersibility.

In the preferred embodiment of the present invention, a weight ratio of the inorganic fine particles with the secondary average particle diameter of less than 0.5 $\mu$m and the inorganic pigment with an average particle diameter of 0.5 $\mu$m or more is mainly determined in relation to a Haze value, an image clarity and ink-absorption property of the ink-receptive layer, and it is generally 82/18 to 99/1, preferably 90/10 to 98/2. When the amount of the inorganic pigment exceeds 18 parts by weight, transparency is largely lowered and when it is less than 1 part by weight, the effect of lowering the back light is lowered.

In the present invention, a solid content of the ink-receptive layer per unit area is generally 10 g/$m^2$ or more and preferably in a range of 13 to 35 g/$m^2$.

The void-type ink-receptive layer of the present invention contains a binder to maintain a property as a coating layer. As the binder of this kind, a hydrophilic binder which has a high transparency and a high ink-absorption property is preferably used. For using the hydrophilic binder, it is important that the hydrophilic binder does not clog the voids by swelling at the initial stage of permeation of ink. From this point of view, a hydrophilic binder having a relatively low swellability at around the room temperature is preferably selected from the exemplified hydrophilic binders in case of the swelling type ink-receptive layers and used. A particularly preferred hydrophilic binder is a completely or partially saponified polyvinyl alcohol or a cationic-modified polyvinyl alcohol.

Among the polyvinyl alcohols, particularly preferred is a completely or partially saponified polyvinyl alcohol having a saponification degree of 80% or more. Those having an average polymerization degree of 500 to 5000 are preferred.

Also, as the cationic-modified polyvinyl alcohol, there may be mentioned, for example, as disclosed in Japanese Provisional Patent Publication No. 10483/1986, a polyvinyl alcohol having a primary to tertiary amino groups or a quaternary ammonium group on the main chain or side chain of the polyvinyl alcohol.

Other kind of hydrophilic binder may be used in combination with polyvinyl alcohol, and it is preferably used in an amount of 20% by weight or less based on that of the polyvinyl alcohol.

In the present invention, a weight ratio of the total amount of the inorganic fine particles and the inorganic pigments to the amount of the hydrophilic binder contained in the void-type ink-receptive layer is determined according to the ink-absorption property and surface strength, and it is generally in a range of 100/60 to 100/8, preferably in a range of 100/50 to 100/10. When a ratio of the inorganic fine particles to the hydrophilic binder is heightened, the ink-absorption property is improved, however, it causes problems such that transparency is lowered, cracks at drying process tend to occur, the surface strength is decreased and dusting happens easily. On the contrary, when the ratio is lowered, the surface strength is improved, however, the ink-absorption property is lowered.

The ink-jet recording material of the present invention has a Haze value of the ink-receptive layer defined by JIS-K-7105 of 25% or less, preferably 18% or less. When the value is higher than this value, sharpness of the observed image is lowered, easily causing a mistake in observation especially in a medical field where a back lighting system is used.

In the present invention, when a Haze value of the ink-jet recording material is shown to be Ha, a haze value of the used support is shown to be Hb and a Haze value of the ink-receptive layer is shown to be Hc, Hc is simply obtained by calculating Ha−Hb (Ha minus Hb).

A surface glare which is a problem in a medical use is caused by outside light reflecting from the surface of the ink-receptive layer, however, it has not shown a sufficient correlation with a gloss value measured at an angle of 60° or 75°. As a result of analyzing various evaluation methods, an image clarity C value obtained by a image clarity test has been shown to have a close relation with the surface glare due to back light that is, reflected light.

The image clarity defined in the present invention is an index how clearly an image is reflected when the material is projected on the coated surface and it is determined by JIS-H-8686. In this invention, it is evaluated with an image clarity C value obtained by using an image clarity analyzer produced by Suga Testing Machine K. K. (Japan) and an optical comb with a width of 2.0 mm. The higher the image clarity C value is, the better the surface properties, therefore, it is preferable for a general use such as photos, printings and publications. However, in case of the ink-jet recording material for a back lit use using a light transmitting support, it is demonstrated when the image clarity of the surface of the ink-receptive layer is high, the image obtained by transmitted light is hard to be observed due to surface glare caused by reflection of the outside light. Especially in a medical use, etc., where an important judgment is required to be made based on the image content, lowering in the surface glare is especially an important issue. In the present invention, the image clarity C value is 85% or less, preferably 83% or less, and more preferably 80% or less.

The following means can be employed for making the Haze value and the image clarity C value of the ink-receptive layer within the ranges of the present invention. That is, in the case of the void-type ink-receptive layer containing the inorganic fine particles, by changing (i) an average particle diameter of the inorganic fine particles having an average particle diameter of the secondary particle of less than 0.5 $\mu$m, (ii) an average particle diameter of the inorganic pigment having an average particle diameter of 0.5 to 10 $\mu$m, (iii) a formulation amount (a weight ratio) of the inorganic pigment having an average particle diameter of 0.5 to 10 $\mu$m to the inorganic fine particles having an average particle diameter of the secondary particle of less than 0.5

μm. (iv) a formulation amount (a weight ratio) of the hydrophilic polymer to the total amount of the inorganic fine particles and the inorganic pigment mentioned in the above (iii), or (v) a coating amount of the ink-receptive layer. In the case of (i) and (ii), if the particle diameter is small, the Haze value is lowered and the image clarity C value is heightened. If the particle diameter is large, reverse effects to the above can be obtained. When the characteristics as an ink-jet recording material such as ink-absorption property, strength, etc. are considered, the weight ratio of the above (iii) is in the range of 1/99 to 18/82 (the inorganic pigment/the inorganic fine particles). If the amount of the inorganic pigment is smaller than the above range, the Haze value is lowered and the image clarity C value is heightened. If the amount of the same is larger than the above range, reverse effects to the above can be obtained. In the above (iv), the weight ratio is in the range of 8/100 to 60/100 (the hydrophilic polymer/(the inorganic pigment +the inorganic fine particles)). If the amount of the hydrophilic polymer is smaller than the above range, the Haze value is heightened and the image clarity C value is lowered. If the amount of the same is larger than the above range, reverse effects to the above can be obtained. The coating amount of the ink-receptive layer of the above (v) is 10 to 40 $g/m^2$. When it is smaller than the above value, the Haze value is lowered and the image clarity C value is heightened. If the amount of the same is larger than the above range, reverse effects to the above can be obtained. In the points of strength and cracks, it is preferably 35 $g/m^2$ or less. In the case of the swelling type ink-receptive layer, the factors of the above-mentioned (ii) and (v) are similarly applied to, and there is a further factor wherein (vi) a formulation amount (a weight ratio) of the inorganic pigment having an average particle diameter of 0.5 to 10 μm to the hydrophilic polymer is 0.5/100 to 30/100 (the inorganic pigment/the hydrophilic polymer). If the amount of the inorganic pigment is less than the above range, the Haze value is lowered and the image clarity C value is heightened. If the amount of the same is larger than the above range, reverse effects to the above can be obtained.

The ink-receptive layer of the present invention preferably contains a cationic compound. As the cationic compound, there may be mentioned, for example, a cationic polymer and a water-soluble metallic compound to be used for the purpose of improving water resistance. The cationic polymer, when it is used in combination with fumed silica, tends to deteriorate transparency, on the other hand, the water-soluble metallic compound prevents fine cracks and improves transparency. Therefore, by using admixture of two kinds of fumed silica and the water-soluble metallic compound, advantages such as improved ink-absorption property, high water resistance and high transparency can be attained.

As the cationic polymer to be used in the present invention, there may be preferably mentioned polyethyleneimine, poly-diallylamine, polyallylamine, as well as polymers having a primary to tertiary amino group or a quaternary ammonium group as disclosed in Japanese Provisional Patent Publications No. 20696/1984, No. 33176/1984, No. 33177/1984, No. 155088/1984, No. 11389/1985, No. 49990/1985, No. 83882/1985, No. 109894/ 1985, No. 198493/1987, No. 49478/1988, No. 115780/1988, No. 280681/1988, No. 40371/1989, No. 234268/1994, No. 125411/1995 and No. 193776/1998, etc. A weight average molecular weight (Mw) of these cationic polymers is preferably about 5,000 or more, more preferably about 5,000 to about 100,000.

An amount of these cationic polymers is preferably about 1 to 10% by weight, more preferably about 2% to 7% by weight based on the amount of the inorganic fine particles.

The water-soluble metallic compound to be used in the present invention may include, for example, a water-soluble polyvalent metallic salt. As such a salt, there may be mentioned a water-soluble salt of a metal selected from the group consisting of calcium, barium, manganese, copper, cobalt, nickel, aluminum, iron, zinc, zirconium, chromium, magnesium, tungsten, and molybdenum. More specifically, such a water-soluble metallic compound may include, for example, calcium acetate, calcium chloride, calcium formate, calcium sulfate, barium acetate, barium sulfate, barium phosphate, manganese chloride, manganese acetate, manganese formate dihydrate, ammonium manganese sulfate hexahydrate, cupric chloride, copper (II) ammonium chloride dihydrate, copper sulfate, cobalt chloride, cobalt thiocyanate, cobalt sulfate, nickel sulfate hexahydrate, nickel chloride hexahydrate, nickel acetate tetrahydrate, ammonium nickel sulfate hexahydrate, amide nickel sulfate tetrahydrate, aluminum sulfate, aluminum sulfite, aluminum thiosulfate, poly(aluminum chloride), aluminum nitrate nonahydrate, aluminum chloride hexahydrate, ferrous bromide, ferrous chloride, ferric chloride, ferrous sulfate, ferric sulfate, zinc bromide, zinc chloride, zinc nitrate hexahydrate, zinc sulfate, zirconium acetate, zirconium chloride, zirconium oxychloride octahydrate, zirconium hydroxychloride, chromium acetate, chromium sulfate, magnesium sulfate, magnesium chloride hexahydrate, magnesium citrate nonahydrate, sodium phosphorus wolframate, tungsten sodium citrate, dodecawolframatophosphate n hydrate, dodecawolframatosilicate 26 hydrate, molybdenum chloride, dodecamolybdatephosphate n hydrate, etc. Preferable is a zirconium compound in terms of property.

Further, as a cationic compound, there may be mentioned a basic poly(aluminum hydroxide) compound which is an inorganic aluminum-containing cationic polymer The above-mentioned poly(aluminum hydroxychloride) compound is a water-soluble poly(aluminum hydroxide) a main component of which is represented by the following formula (1), (2) or (3), and which contains a polynuclear condensed ion which is basic and a polymer in a stable form, such as $[Al_6(OH)_{15}]^{3+}$, $[Al_8(OH)_{20}]^{4+}$, $[Al_{13}(OH)_{34}]^{5+}$, $[Al_{21}(OH)_{60}]^{3+}$, etc.

$$[Al_2(OH)_nCl_{6-n}]_m \quad (1)$$

$$[Al(OH)_3]_nAlCl_3 \quad (2)$$

$$Al_n(OH)_mCl_{(3n-m)} \;\; 0<m<3n \quad (3)$$

These water-soluble aluminum compounds are commercially available from Taki Chemical, K. K., Japan under the trade name of poly(aluminum chloride) (PAC, trade name) as a water treatment agent, from Asada Chemical K. K., Japan under the trade name of poly(aluminum hydroxide) (Paho, trade name), from K. K. Riken Green, Japan under the trade name of Pyurakemu WT (trade name) and other manufacturers with the same objects whereby various kinds of different grades can be easily obtained. In the present invention, those commercially available products can be used as they are. However, there are some products having unsuitably low pHs, and in this case, they can be used by optionally adjusting pH.

In the present invention, an amount of the above-mentioned water-soluble metallic compound contained in the ink-receptive layer is about 0.1 $g/m^2$ to 10 $g/m^2$, preferably 0.2 $g/m^2$ to 5 $g/m^2$.

The above-mentioned cationic compound may be used in combination of two or more compounds. For example, the cationic polymer and the water-soluble metallic compound may be used in combination.

The ink-receptive layer of the present invention may further contain various kinds of oil droplets to improve brittleness of a film. As such oil droplets, there may be mentioned a hydrophobic organic solvent having a high boiling point (for example, liquid paraffin, dioctyl phthalate, tricresyl phosphate, silicone oil, etc.) or polymer particles (for example, particles in which at least one of a polymerizable monomer such as styrene, butyl acrylate, divinyl benzene, butyl methacrylate, hydroxyethyl methacrylate, etc. is polymerized) each having a solubility in water at room temperature of 0.01% by weight or less. Such oil droplets can be used in an amount in the range of about 5 to about 50% by weight based on the amount of the hydrophilic binder.

In the present invention, the ink-receptive layer may contain a suitable cross-linking agent (film hardening agent) to improve water resistance and dot reproducibility. Specific examples of the cross-linking agent may include an aldehyde type compound such as formaldehyde and glutaraldehyde; a ketone compound such as diacetyl and chloropentanedione; bis(2-chloroethylurea)-2-hydroxy-4,6-dichloro-1,3,5-triazine, a compound having a reactive halogen as disclosed in U.S. Pat. No. 3,288,775; divinylsulfone; a compound having a reactive olefin as disclosed in U.S. Pat. No. 3,635,718; a N-methylol compound as disclosed in U.S. Pat. No. 2,732,316; an isocyanate compound as disclosed in U.S. Pat. No. 3,103,437; an aziridine compound as disclosed in U.S. Pat Nos. 3,017,280 and 2,983,611; a carbodiimide type compound as disclosed in U.S. Pat. No. 3,100,704; an epoxy compound as disclosed in U.S. Pat. No. 3,091,537; a halogen carboxyaldehyde compound such as mucochloric acid, a dioxane derivative such as dihydroxydioxane, an inorganic cross-linking agent such as chromium alum, zirconium sulfate, boric acid and a borate, and they may be used singly or in combination of two or more. An amount of the cross-linking agent is preferably about 0.01 to about 40 g, more preferably about 0.1 to about 30 g relative to 100 g of the hydrophilic binder constituting the ink-receptive layer.

As a surfactant to be used in the present invention, at least one kind is optionally selected from a cationic surfactant such as aliphatic amine, aliphatic tertiary ammonium salt, benzalkonium salt, benzethonium chloride, pyridium salt, imidazorium salt and the like, an ampholytic surfactant such as carboxy betain type, aminocarboxylic acid salt, imidazolinium betain, lecithin and the like, or a nonionic surfactant such as polyoxyethylene alkylether, polyoxyethylene alkylphenylether, polyoxyethylene sorbitan fatty acid esterpolyethylene glycol fatty acid ester, sucrose fatty acid ester, fatty acid alkanolamide and the like. An anionic surfactant such as carbonate, sulfonate and the like may also be used, however, an amount is limited in view of agglomerating property of the ink-receptive layer. Among the above, the one with HLB (hydrophilic-lipophilic balance) value of 3 to 8 is preferably selected for adjusting a contact angle formed with linseed oil.

In the present invention, preferably a contact angle between the surface of the ink-jet recording material and water is 13 to 35° and a contact angle with linseed oil is 8 to 20°. It has been found that when each of the contact angles with water and linseed oil are respectively in the range, fingerprint resistance is improved for the first time. The reasons for this is unknown, however, fingertip mainly contains water from a sweat gland and oil and fat components from the finger, and it is presumed that those components delicately influence each other to form a fingerprint. The ink-absorption property of the ink-receptive layer is approximately predetermined by choosing a kind and amount of the hydrophilic polymer and the inorganic fine particle, and when the contact angle with water or with linseed oil is outside the objected range, it is preferably adjusted by using a surfactant, an oil droplet, and an organic solvent. Especially, a surfactant with the HLB value of 3 to 8 is preferable since it has little influence on the ink-jet properties such as ink absorption, etc. It is possible to shift the contact angle into the range of the present invention by using a hydrophobic polymer such as styrene/butadiene type, urethane type latex, etc. in combination with a hydrophilic polymer, but ink absorption is largely lowered. In case of a swelling-type ink-receptive layer, a content of the hydrophobic polymer is in a range of 10 to 50% by weight based on the ink-receptive layer in order to make ink absorption and fingerprint resistance suitable for a practical use. In case of a void-type ink-receptive layer, when a weight ratio of the hydrophobic polymer relative to hydrophilic polymer is in a range of 1/10 to 1/1, and the weight ratio of the total amount of the hydrophilic polymer and the hydrophobic polymer relative to the inorganic fine particle is in a range of 1/10 to 3/10, ink absorption and fingerprint resistance are in the range of practical use.

When the contact angle between the surface of the recording material and water is larger than 35°, water contained in the fingerprint remains on the surface, thereby causing a stain, and in addition, permeability of the aqueous ink is low and feathering tends to occur. When it is smaller than 13°, it is not preferable since deformation is easily caused by permeation of water contained in the fingerprint and the aqueous ink tends to extend causing bleeding. It is preferably in the range of 13 to 30°.

When the contact angle between the surface of the recording material and linseed oil is larger than 20°, oil and fat contained in the fingerprint tend to remain on the surface, thereby leaving a conspicuous stain. When it is smaller than 8°, it is not preferable due to poor permeability of the aqueous ink. It is preferably in the range of 8 to 15°.

In the present invention, for adjusting the contact angle between the surface of the recording material and water or linseed oil, various types of oil droplets may be contained. As such an oil droplet, there may be contained the same kind as various hydrophobic organic solvent with a high boiling point that is used to improve brittleness of the coating.

In the present invention, a protective layer may be provided on the surface of the ink-receptive layer provided that it does not markedly lower ink absorption and transparency. In this case too, the contact angles of the surface of the protective layer with water and with linseed oil are preferably in the ranges of the present invention, various additives may be used that are contained in the ink-receptive layer such as a surfactant, hydrophobic organic solvent with high boiling point and the like. A thickness of the protective layer is generally 5 $\mu$m or less.

In the present invention, to the ink-receptive layer, various kinds of conventionally known additives such as a coloring dye, a coloring pigment, a fixing agent of an ink dye, an UV absorber, an antioxidant, a dispersant of the pigment, an antifoaming agent, a leveling agent, an antiseptic agent, a fluorescent brightener, a viscosity stabilizer, a pH controller, etc. may be added.

In the present invention, the coating method of the ink-receptive layer or protective layer is not particularly limited, and a coating method conventionally known in the art may be used. For example, there may be mentioned a slide bead system, a curtain system, an extrusion system, an air knife system, a roll coating system, a rod bar coating system, etc.

In the present invention, the ink-receptive layer may be constituted of a single layer or plural layers. In case of the plural layers, they may be divided according to their functions.

As the light transmitting support to be used in the present invention, there may be mentioned, for example, a plastic resin film such as a polyester resin including polyethylene terephthalate (PET) and polyethylene naphthalate, a diacetate resin, a triacetate resin, a cellulose resin such as nitro cellulose and cellulose acetate, a polyolefin resin, an acryl resin, a polycarbonate resin, a polyvinyl chloride, a polyimide resin, polysulfone, polyphenylene oxide, cellophane, celluloid, etc. Especially, a polyester film is preferably used in terms of property such as heat resistance and a production cost. A thickness of the resin film support to be used in the present invention is preferably about 50 μm to about 250 μm considering a curling property and handling.

In order to adjust transparency and a color tone of the light transmitting support, for example, it is produced by blending thermoplastic resin with the inorganic fine particles, and as the inorganic fine particles, coloring pigments and the like may be used such as calcium carbonate, titanium dioxide, talc, silica, carbon black, etc. In the present invention, opacity of the support to be used is preferably 5 to 60%. When the opacity is higher than 60%, its light transmittance is lowered to produce a blurred and dark image. When it is lower than 5%, transmitted light becomes too intense, and an image is hard to be observed depending on a kind of the light source. For a medial use, blue PET film that is colored in blue is preferably used.

When a coating solution of the ink-receptive layer is coated on the surface of the plastic resin film support, prior to the coating, the activation treatment such as the corona discharge treatment, the flame treatment, the ultraviolet irradiation treatment, plasma treatment, etc. may be generally carried out.

In the present invention, a primer layer mainly consisting of a natural resin and synthetic resin is preferably provided on the surface of the light transmitting support such as a plastic resin film, etc. in view of transparency. After coating a coating solution for the ink-receptive layer on the surface of the primer layer, by cooling it and drying at a relatively low temperature, transparency is further improved.

Preferable primer layer mainly comprises a synthetic resin. As a preferred synthetic resin, an acryl resin, a polyester resin, vinylidene chloride, a vinyl chloride resin, a vinyl acetate resin, polystyrene, a polyamide resin, a polyurethane resin and the like are mentioned. As the polyurethane resin, an aqueous dispersion type polyurethane emulsion is preferred. Those resins can be coated in a form of a solution of an organic solvent or an aqueous solution, preferably an aqueous dispersion type polymer, and coated on the support in a form of an emulsion or a latex.

Those synthetic resins are contained in an amount of 60% by weight or more based on the total solid components constituting the primer layer. Preferably it is contained in an amount of 80% by weight or more. Further, in the primer layer, a surfactant, isocyanate, a cross-linking agent such as epoxy, etc., fine particle such as colloidal silica, etc. may be contained.

The above-mentioned primer layer is provided on the support in a thickness of 0.01 to 5 μm (a thickness in a dried state). Preferably it is in the range of 0.05 to 5 μm.

To the support of the present invention, various kinds of back coating layer(s) may be provided for the purpose of providing antistatic property, conveying property, anti-curl property, etc. In the back coating layer, an inorganic antistatic agent, an organic antistatic agent, a hydrophilic binder, a latex, a hardening agent, a surfactant, etc. may be included in optional combination.

EXAMPLES

In the following, the present invention is explained in more detail by referring to Examples, but the present invention is not limited by these Examples. Incidentally, all "part" in the present specification means "part by weight".

EXAMPLES 1 and 2

Light transmitting supports were prepared as shown below.

<Support A>

A polyethylene terephthalate film containing blue inorganic pigments with a thickness of 175 μm (opacity: 15%), the surface of which was treated by the oxygen plasma treatment.

<Support B>

A polyethylene terephthalate film containing blue inorganic pigments with a thickness of 175 μm (opacity: 15%) provided thereon, a primer layer having a composition shown below, with a thickness in a dried state of 0.3 μm.

Primer layer: a latex (weight average molecular weight: 42,000) comprising vinylidene chloride:methyl acrylate:acrylic acid (90:9:1, % by weight).

On the above-mentioned 2 types of supports, a coating solution for an ink-receptive layer having a composition indicated below was coated by using a slide bead coating apparatus, and they were subjected to drying. The coating solution for the ink-receptive layer shown below was prepared to have a concentration of a solid content of 10% by weight, and it was coated so that a coated amount of the solid content became 20 $g/m^2$. One using the support A was used as an ink-jet recording material in Example 1, and one using the support B was used as an ink-jet recording material in Example 2.

<Coating Solution for an Ink-receptive Layer>

| | |
|---|---|
| Fumed silica<br>(Average primary particle diameter: 7 nm, Average secondary particle diameter: 0.15 μm, degree of dispersion: 0.4) | 95 parts |
| Silica prepared by the wet process<br>(Nipsil E-220 A, trade name, manufactured by Nippon Silica Industrial Co., Japan, average particle diameter: 2 μm) | 5 parts |
| Dimethyldiaryl ammonium chloride homopolymer | 3 parts |
| Boric acid | 4 parts |
| Polyvinyl alcohol<br>(Saponification degree: 88%, Average polymerization degree: 3,500) | 20 parts |
| Surfactant | 0.3 part |
| Zirconium acetate | 2 parts |

Condition for drying after coating is shown below.

After cooling at a temperature of 5° C. for 30 seconds, drying was carried out at 45° C. and 10% RH (relative humidity) until the concentration of the total solid content became 90% by weight, followed by drying at 35° C. and 10% RH.

The ink-jet recording materials obtained as above were evaluated as mentioned below. The results are shown in Table 1.

<Image Clarity>

Image clarity C value defined by JIS-H-8686 was measured with 2.0 mm width of an optical comb, using an image clarity measuring apparatus available from Suga Testing Machine, K. K., Japan. A test material was fixed on a test piece mounting base by suction while avoiding underestimate of a measured value due to curling of the test piece, etc. Each sample was measured for 5 times and an average was taken. When the image clarity was higher than 85%, surface glare was conspicuous by direct observation. It is preferably 83% or less.

<Ink-absorption Property>

Using a plotter (Novajet-PRO 42e, trade name, manufactured by ENCAD Co.) and GS ink, C (cyan), M (magenta) and Y (yellow) were each printed with 100%, and immediately after the printing, a PPC paper was overlapped over the printed portion with a slight pressurization, and the degree of an amount of the ink transferred to the PPC paper was observed with naked eyes and evaluated by the following standards.

◎: No transfer was observed.
○: Partial transfer was observed.
Δ: Suitable for practical use despite of transfer.
X: Not suitable for practical use due to transfer.

<Haze Value of the Ink-receptive Layer>

Haze values defined by JIS-K 7105 were measured with respect to a polyethylene terephthalate film support to be used and the obtained ink-jet recording material, using Poic integrating sphere type Hazemeter manufactured by Nippon Precision Optical Instrument Co., Japan, and the difference between them was calculated.

<Surface Strength>

On the surface of the ink-jet recording material, attached was Scotch clear tape (CH-24, trade name, manufactured by Sumitomo 3M Co., Japan) and immediately peeled off by hand. Amount exfoliated from the ink-receptive layer onto the adhesive surface of the tape was measured by direct observation with eyes and evaluated.

○: No peeling off observed.
Δ: Partial peeling observed.
X: Not suitable for practical use due to peeling.

<Image Sharpness>

By using a backlit apparatus (Schaukasten) for evaluating in a light room, image sharpness was observed with naked eyes and evaluated by the following standard.

○: Printed image was clearly observed with eyes.
Δ: Sharpness of the printed image was slightly lowered but suitable for practical use.
X: Sharpness of the printed image was poor and unsuitable for practical use.

Example 3

An ink-jet recording material of Example 3 was obtained in the same manner as in Example 2, except that the composition of the ink-receptive layer was changed as shown below. The results are shown in Table 1.

<Coating Solution for an Ink-receptive Layer>

| | |
|---|---|
| Fumed silica (Average primary particle diameter: 12 nm, Average secondary particle diameter: 0.2 μm, degree of dispersion: 0.3) | 95 parts |
| Silica prepared by the wet process (Nipsil E-220 A, trade name, manufactured by Nippon Silica Industrial Co., Japan, average particle diameter: 2 μm) | 5 parts |
| Dimethyldiaryl ammonium chloride homopolymer | 3 parts |
| Boric acid | 4 parts |
| Polyvinyl alcohol (Saponification degree: 88%, Average polymerization degree: 3,500) | 20 parts |
| Surfactant | 0.3 part |
| Zirconium acetate | 2 parts |

Example 4

An ink-jet recording material of Example 4 was obtained in the same manner as in Example 2, except that the composition of the ink-receptive layer was changed as shown below. The results are shown in Table 1.

<Coating Solution for an Ink-receptive Layer>

| | |
|---|---|
| Fumed silica (Average primary particle diameter: 7 nm, Average secondary particle diameter: 0.15 μm, degree of dispersion: 0.4) | 28.5 parts |
| Fumed silica (Average primary particle diameter: 12 nm, Average secondary particle diameter: 0.2 μm, degree of dispersion: 0.3) | 66.5 parts |
| Silica prepared by the wet process (Nipsil E-220 A, trade name, manufactured by Nippon Silica Industrial Co., Japan, average particle diameter: 2 μm) | 5 parts |
| Dimethyldiaryl ammonium chloride homopolymer | 3 parts |
| Boric acid | 4 parts |
| Polyvinyl alcohol (Saponification degree: 88%, Average polymerization degree: 3,500) | 20 parts |
| Surfactant | 0.3 part |
| Zirconium acetate | 2 parts |

Example 5

An ink-jet recording material of Example 5 was obtained in the same manner as in Example 2, except that the composition of the ink-receptive layer was changed as shown below. The results are shown in Table 1.

<Coating Solution for an Ink-receptive Layer>

| | |
|---|---|
| Fumed silica (Average primary particle diameter: 7 nm, Average secondary particle diameter: 0.15 μm, degree of dispersion 0.4) | 84 parts |
| Silica prepared by the wet process (Nipsil E-220 A, trade name, manufactured by Nippon Silica Industrial Co., Japan, average particle diameter: 2 μm) | 16 parts |
| Dimethyldiaryl ammonium chloride homopolymer | 3 parts |
| Boric acid | 4 parts |
| Polyvinyl alcohol (Saponification degree: 88%, Average polymerization degree: 3,500) | 20 parts |
| Surfactant | 0.3 part |
| Zirconium acetate | 2 parts |

Example 6

An ink-jet recording material of Example 6 was obtained in the same manner as in Example 2, except that the composition of the ink-receptive layer was changed as shown below. The results are shown in Table 1.

<Coating Solution for an Ink-receptive Layer>

| | |
|---|---|
| Fumed silica (Average primary particle diameter: 7 nm, Average secondary particle diameter: 0.15 μm, degree of dispersion: 0.4) | 98 parts |
| Silica prepared by the wet process (Finesil X-12, trade name, manufactured by Tokuyama Co., Japan, average particle diameter: 10 μm) | 2 parts |
| Dimethyldiaryl ammonium chloride homopolymer | 3 parts |
| Boric acid | 4 parts |
| Polyvinyl alcohol (Saponification degree: 88%, Average polymerization degree: 3,500) | 20 parts |
| Surfactant | 0.3 part |
| Zirconium acetate | 2 parts |

Example 7

An ink-jet recording material of Example 7 was obtained in the same manner as in Example 1, except that zirconium acetate was removed from the composition of the ink-receptive layer. The results are shown in Table 1.

Example 8

An ink-jet recording material of Example 8 was obtained in the same manner as in Example 1, except that the composition of the ink-receptive layer is changed as shown below and coating and drying was conducted so that the solid content was 18 g/m$^2$. The results are shown in Table 1.

<Coating Solution for an Ink-receptive Layer>

| | |
|---|---|
| Gelatin | 50 parts |
| Polyvinyl alcohol | 45 parts |
| (KM-618, trade name, manufactured by Kuraray, Co., Japan) | |
| Silica prepared by the wet process | 5 parts |
| (Nipsil E-220 A, trade name, manufactured by Nippon Silica Industrial Co., Japan, average particle diameter: 2 μm) | |
| Surfactant | 0.1 part |

Comparative Example 1

An ink-jet recording material of Comparative Example 1 was obtained in the same manner as in Example 1, except that silica prepared by the wet process was removed from the composition of the ink-receptive layer. The results are shown in Table 1.

Comparative Example 2

An ink-jet recording material of Comparative Example 2 was obtained in the same manner as in Example 8, except that silica prepared by the wet process was removed from the composition of the ink-receptive layer. The results are shown in Table 1.

Comparative Example 3

An ink-jet recording material of Comparative Example 3 was obtained in the same manner as in Example 1, except that the composition of the ink-receptive layer is changed as shown below. The results are shown in Table 1.

<Coating Solution for an Ink-receptive Layer>

| | |
|---|---|
| Fumed silica | 81 parts |
| (Average primary particle diameter: 7 nm, Average secondary particle diameter: 0.15 μm, degree of dispersion: 0.4) | |
| Silica prepared by the wet process | 19 parts |
| (Finesil X-12, trade name, manufactured by Tokuyama Co., Japan, average particle diameter: 10 μm) | |
| Dimethyldiaryl ammonium chloride homopolymer | 3 parts |
| Boric acid | 4 parts |
| Polyvinyl alcohol | 20 parts |
| (Saponification degree: 88%, Average polymerization degree: 3,500) | |
| Surfactant | 0.3 part |
| Zirconium acetate | 2 parts |

TABLE 1

| | Image clarity | Ink-absorption property | Haze value | Surface strength | Image sharp-ness |
|---|---|---|---|---|---|
| Example 1 | 75 | ○ | 8.6 | ○ | ○ |
| Example 2 | 74 | ○ | 7.5 | ○ | ○ |
| Example 3 | 72 | ◎ | 8.9 | ○ | ○ |
| Example 4 | 73 | ◎ | 8.2 | ○ | ○ |
| Example 5 | 63 | Δ | 22.7 | ○ | Δ |
| Example 6 | 85 | ○ | 14.0 | Δ | ○~Δ |
| Example 7 | 76 | ○ | 9.5 | ○ | ○~Δ |
| Example 8 | 82 | Δ | 7.0 | ○ | Δ |
| Comparative Example 1 | 88 | ○ | 7.4 | ○ | ○ |
| Comparative Example 2 | 94 | Δ | 5.8 | ○ | Δ |
| Comparative Example 3 | 60 | x | 29.0 | ○ | x |

Results

Example 2 was a case where a primer layer was provided on the polyethylene terephthalate film that was used as a support in Example 1, and Haze value for Example 2 was smaller than that of Example 1, Exhibiting an improved transparency. Image sharpness by transmitted light was excellent in both Examples 1 and 2.

Example 3 where the fumed silica used in Example 2 was replaced by the fumed silica with an average primary particle diameter of 12 nm, showed a slightly lower image clarity and showed a tendency of low surface glare. On the other hand, ink-absorption was improved and image sharpness was excellent, however, the Haze value was increased thereby lowering transparency of the ink-receptive layer.

Example 4 was a case where in Example 2, the fumed silica with the average primary particle diameters of 7 nm and 12 nm were mixed in a ratio of 30/70, and though it showed a slightly higher haze value, ink-absorption was improved, and image sharpness was excellent.

Example 5 was a case where in Example 2, silica prepared by the wet process in the ink-receptive layer was increased to 16 parts, and its image clarity was lowered thereby surface glare was improved, however, ink-absorption was lowered, and the Haze value was high exhibiting the lower limit for a practical use of image sharpness by transmitted light.

Example 6 was a case where 2 parts of the silica prepared by the wet process with the average particle diameter of 10 μm was used, and it showed a high image clarity thereby exhibiting the surface glare at the lowest level for a practical use. Also, the Haze value was considerably high, while the image sharpness and the surface strength tend to low. In comparison with Example 5 where the amount of the silica prepared by the wet process with the average particle diameter of 2 μm was increased to 14 parts, feeling of roughness was increased exhibiting the lowest level for a practical use.

Example 7 was a case where zirconium acetate was removed from the composition of Example 1, and it showed a slightly higher Haze value causing a low transparency, while the image sharpness, etc. was at a level without problems.

Example 8 was a case where 5 parts of the silica prepared by the wet process with an average particle diameter of 2 μm was added to the composition of gelatin and polyvinyl alcohol, it showed a lower Haze value than that of Example 1, with an improved transparency, while ink-absorption was relatively low and image sharpness was lowered since reproduction of the printed image was lowered. Image clarity was relatively high meaning an increased surface glare compared to Example 1, but it was in a range of being suitable for a practical use.

Comparative Example 1 was a case where the silica prepared by the wet process was removed from the composition of the Example 1, and although it showed a good Haze value and good image sharpness, it had a high image clarity and unfavorable surface glare.

Comparative Example 2 was a case where the silica prepared by the wet process was removed from the composition of the Example 8, and although it showed a very good Haze value, image clarity was high, increasing surface glare to a level unsuitable for a practical use.

Comparative Example 3 was a case where the weight ratio of the fumed silica with the average primary particle diameter of 7 nm and the silica prepared by the wet process with the average particle diameter of 10 $\mu$m used in Example 1 was changed to 81/19, and it showed a low image clarity being preferable, ink-absorption was unsatisfactory, the Haze value of the ink-receptive layer was high, and image sharpness was at a level unsuitable for a practical use.

Examples 11 and 12

Light transmitting supports were prepared as described below.

<Support A>

A polyethylene terephthalate film containing a blue inorganic pigment with a thickness of 170 $\mu$m (opacity: 15%), surface treated by the oxygen plasma treatment.

<Support B>

A polyethylene terephthalate film containing a blue inorganic pigment with a thickness of 170 $\mu$m (opacity: 15%) provided thereon, a primer layer having a composition shown below, with a thickness in a dried state of 0.3 $\mu$m.

Primer layer: a latex (weight average molecular weight: 42,000) comprising vinylidene chloride:methyl acrylate-:acrylic acid (90:9:1,% by weight).

On the above-mentioned 2 types of supports, a coating solution for an ink-receptive layer having a composition indicated below was coated using a slide bead coating apparatus, and they were subjected to drying. The coating solution for the ink-receptive layer shown below was prepared to have a concentration of a solid content of 10% by weight, and it was coated so that a coated amount of the solid content became 20 g/m$^2$. One using the support A was used as an ink-jet recording material in Example 11, and one using the support B was used as an ink-jet recording material in Example 12.

<Coating Solution for an Ink-receptive Layer>

| | |
|---|---|
| Fumed silica | 95 parts |
| (Average primary particle diameter: 7 nm, Average secondary particle diameter: 0.21 $\mu$m) | |
| Silica prepared by the wet process | 5 parts |
| (Nipsil E-220 A, trade name, manufactured by Nippon Silica Industrial Co., Japan, average particle diameter: 2 $\mu$m) | |
| Dimethyldiaryl ammonium chloride homopolymer | 3 parts |
| Boric acid | 4 parts |
| Polyvinyl alcohol | 20 parts |
| (Saponification degree: 88%, Average polymerization degree: 3,500) | |
| Surfactant | 1.0 part |
| (SO-10; HLB value: 4.3, trade name, manufactured by Nikko Chemicals Co., Japan) | |
| Zirconium acetate | 2 parts |

Condition of drying after coating is shown below.

After cooling at a temperature of 5° C. for 30 seconds, drying was carried out at 45° C. and 10% RH until the concentration of the total solid content was 90% by weight, followed by drying at 35° C. and 10% RH.

The ink-jet recording materials obtained as above were evaluated with respect to image clarity, ink-absorption property and Haze value of the ink-receptive layer in the same manner as in Examples 1 and 2, while contact angle and fingerprint resistance were evaluatedas mentioned below. The results are shown in Table 2.

<Contact Angle>

A contact angle was measured by a recorded image immediately after dropping one drop (about 0.1 ml) of water or linseed oil on the surface of the sample under the environmental conditions at 23° C. and 55% RH.

<Fingerprint Resistance>

The surface of the ink-receptive layer was observed after a finger was pushed against the ink-receptive layer, and evaluated according to the standard shown below.

○: No fingerprint was observed.

Δ: Fingerprint was partially observable.

X: Fingerprint clearly observable.

Example 13

An ink-jet recording material of Example 13 was obtained in the same manner as in Example 12, except that the composition of the ink-receptive layer was changed as shown below. The results are shown in Table 2.

<Coating Solution for an Ink-receptive Layer>

| | |
|---|---|
| Fumed silica | 95 parts |
| (Average primary particle diameter: 7 nm, Average secondary particle diameter: 0.21 $\mu$m) | |
| Silica prepared by the wet process | 5 parts |
| (Nipsil E-220 A, trade name, manufactured by Nippon Silica Industrial Co., Japan, average particle diameter: 2 $\mu$m) | |
| Dimethyldiaryl ammonium chloride homopolymer | 3 parts |
| Boric acid | 4 parts |
| Polyvinyl alcohol | 20 parts |
| (Saponification degree: 88%, Average polymerization degree: 3,500) | |
| Surfactant | 1.5 part |
| (BO-2; HLB value: 7.5, trade name, manufactured by Nikko Chemicals Co., Japan) | |
| Zirconium acetate | 2 parts |

Example 14

An ink-jet recording material of Example 14 was obtained in the same manner as in Example 12, except that the composition of the ink-receptive layer was changed as shown below. The results are shown in Table 2.

<Coating Solution for an Ink-receptive Layer>

| | |
|---|---|
| Gelatin | 50 parts |
| Polyvinyl pyrrolidone | 45 parts |
| Silica prepared by the wet process | 5 parts |
| (Nipsil E-220 A, trade name, manufactured by Nippon Silica Industrial Co., Japan, average particle diameter: 2 $\mu$m) | |
| Surfactant | 5.5 part |
| (SO-10; HLB value: 4.3, trade name, manufactured by Nikko Chemicals Co., Japan) | |

Example 15

An ink-jet recording material of Example 15 was obtained in the same manner as in Example 11, except that zirconium acetate was removed from the composition of the ink-receptive layer. The results are shown in Table 2.

Example 16

An ink-jet recording material of Example 16 was obtained in the same manner as in Example 12, except that the surfactant in the composition of the ink-receptive layer was replaced by 10 parts of an organic solvent with a high boiling point (dioctyl-phthalate). The results are shown in Table 2.

Example 17

An ink-jet recording material of Example 17 was obtained in the same manner as in Example 12, except that the composition of the ink-receptive layer was changed as shown below. The results are shown in Table 2.

<Coating Solution for an Ink-receptive Layer>

| | |
|---|---|
| Fumed silica<br>(Average primary particle diameter: 7 nm, Average secondary particle diameter: 0.21 μm) | 95 parts |
| Silica prepared by the wet process<br>(Nipsil E-220 A, trade name, manufactured by Nippon Silica Industrial Co., Japan, average particle diameter: 2 μm) | 5 parts |
| Dimethyldiaryl ammonium chloride homopolymer | 3 parts |
| Boric acid | 4 parts |
| Polyvinyl alcohol<br>(Saponification degree: 88%, Average polymerization degree: 3,500) | 20 parts |
| Surfactant<br>(BO-7; HLB value: 10.5, trade name, manufactured by Nikko Chemicals Co., Japan) | 3 part |
| Zirconium acetate | 2 parts |

Example 18

An ink-jet recording material of Example 18 was obtained in the same manner as in Example 12, except that the composition of the ink-receptive layer was changed as shown below. The results are shown in Table 2.

<Coating Solution for an Ink-receptive Layer>

| | |
|---|---|
| Fumed silica<br>(Average primary particle diameter: 7 nm, Average secondary particle diameter: 0.21 μm) | 95 parts |
| Silica prepared by the wet process<br>(Nipsil E-220 A, trade name, manufactured by Nippon Silica Industrial Co., Japan, average particle diameter: 2 μm) | 5 parts |
| Dimethyldiaryl ammonium chloride homopolymer | 3 parts |
| Boric acid | 4 parts |
| Polyvinyl alcohol<br>(Saponification degree: 88%, Average polymerization degree: 3,500) | 10 parts |
| Styrene-Butadiene type latex<br>(ISR-0850; trade name, manufactured by Nippon synthetic rubber Co., Japan) | 5 parts |

Results

Example 12 was a case where a primer layer was provided on the polyethylene terephthalate film that was used as a support in Example 11, and it showed a Haze value smaller than that of Example 11, exhibiting an improved transparency. Image sharpness by transmitted light was excellent in both Examples 11 and 12, and also fingerprint resistance and ink-absorption were excellent.

Example 13 where the surfactant with the HLB value of 4.7 used in Example 12 was replaced by one with the HLB value of 7.3 and an amount thereof was increased, showed as excellent values as in Example 12.

Example 14 was a case where 2 parts of the surfactant with the HLB value of 4.7 with a swelling-type ink-receptive layer, it showed a high contact angle with water of 35° and also a high contact angle with linseed oil of 20°, thereby lowering fingerprint resistance and ink-absorption property.

Example 15 was a case where zirconium acetate was removed from the composition of Example 11, and it showed a slightly higher Haze value causing a low transparency, while the other properties were excellent.

Example 16 was a case where 10 parts of an organic solvent with a high boiling point was used in place of the surfactant used in Example 12, and it showed a high contact angle with water of 30° and lower ink-absorption. It also showed a high Haze value, causing a low transparency at the lowest level for a practical use, while fingerprint resistance was also lowered.

Example 17 where the surfactant used in Example 12 with the HLB value of 4.7 was replaced by one with the HLB value of 10.5 and an amount thereof was increased, showed a lower fingerprint resistance than in Example 12.

Example 18 was a case where the surfactant and dimethyldiaryl ammonium chloride homopolymer were removed from the composition of the ink-receptive layer of Example 12, an amount of polyvinyl alcohol was reduced, and styrene-butadiene type latex was used, it was at the lowest level for a practical use with respect to ink-absorption property, and fingerprint resistance was lowered, relative to Example 12.

As is apparent from the above description, the present invention is able to provide an ink-jet recording material for a back lit use which is free from a problem such as surface glare caused by a backlight even in a medical use where a back lighting system is used, has a high transparency (with a low Haze value), has a high ink-absorption property, exhibiting excellent image reproducibility and surface strength. Further, the present invention provides an ink-jet recording material for a back lit use which is excellent in fingerprint resistance.

What is claimed is:

1. The ink-jet recording material for a back lit use having a light transmitting support and an ink-receptive layer pro-

TABLE 2

| | Contact Angle (°) water | Contact Angle (°) Linseed oil | Finger-print Resist-ance | Image clarity (%) | Ink-absorp-tion property | Haze value (%) | Image sharp-ness |
|---|---|---|---|---|---|---|---|
| Example 11 | 18 | 10 | ○ | 75 | ○ | 8.6 | ○ |
| Example 12 | 17 | 9 | ○ | 74 | ○ | 7.5 | ○ |
| Example 13 | 16 | 8 | ○ | 72 | ○ | 8.9 | ○ |
| Example 14 | 35 | 20 | Δ | 82 | Δ | 7.1 | ○ |
| Example 15 | 20 | 10 | ○ | 76 | ○ | 9.5 | ○ |
| Example 16 | 30 | 16 | Δ | 78 | Δ | 12.2 | Δ |
| Example 17 | 33 | 19 | Δ | 76 | ○ | 9.8 | ○ |
| Example 18 | 29 | 18 | Δ | 80 | Δ | 13.1 | Δ |

vided on the support, wherein the ink-receptive layer comprises a hydrophilic polymer and an inorganic pigment having an average particle diameter of 0.5 to 10 $\mu$m, a Haze value of the ink receptive layer defined by JIS-K-7105 is 25% or less and an image clarity C value of a surface of the ink receptive layer defined by JIS-H-8686 is 85% or less.

2. The ink-jet recording material for a back lit use having a light transmitting support and an ink-receptive layer provided on the support, wherein the ink-receptive layer comprises an inorganic fine particles having an average primary particle diameter of 3 to 50 nm and an average secondary particle diameter of less than 0.5 $\mu$m, a hydrophilic polymer and an inorganic pigment having an average particle diameter of 0.5 to 10 $\mu$m, a Haze value of the ink receptive layer defined by JIS-K-7105 is 25% or less and an image clarity C value of a surface of the ink receptive layer defined by JIS-H-8686 is 85% or less.

3. The ink-jet recording material for a back lit use according to claim 1 or 2, wherein the image clarity C value is 80% or less.

4. The ink-jet recording material for a back lit use according to claim 2, wherein a weight ratio of the hydrophilic binder relative to a total amount of the inorganic fine particles and the inorganic pigment of the ink-receptive layer is in a range of 8 to 60% by weight.

5. The ink-jet recording material for a back lit use according to claim 2, wherein the inorganic fine particle is a fumed silica having an average primary particle diameter of 3 to 30 nm.

6. The ink-jet recording material for a back lit use according to claim 1 or 2, wherein the inorganic pigment is a silica prepared by the wet process.

7. The ink-jet recording material for a back lit use according to claim 1 or 2, wherein the inorganic pigment is contained in an amount of 0.1 to 2 g/m$^2$ in a unit area of the recording material.

8. The ink-jet recording material for a back lit use according to claim 2, wherein the ink-receptive layer contains a water-soluble metallic compound.

9. The ink-jet recording material for a back lit use according to claim 8, wherein the water-soluble metallic compound is a zirconium compound.

10. The ink-jet recording material for a back lit use according to claim 1 or 2, wherein a contact angle of the surface of the ink-jet recording material for a back lit use with water is 13 to 35°, and a contact angle with linseed oil is 8 to 20°.

11. The ink-jet recording material for a back lit use according to claim 10, wherein a contact angle of the surface of the ink-jet recording material for a back lit use with linseed oil is 8 to 15°.

12. The ink-jet recording material for a back lit use according to claim 10, wherein a contact angle of the surface of the ink-jet recording material for a back lit use with water is 13 to 30°.

13. The ink-jet recording material for a back lit use according to claim 10, wherein the ink-receptive layer contains a surfactant with a HLB value of 3 to 8.

14. The ink-jet recording material for a back lit use according to claim 1 or 2, wherein the ink-jet recording material for a back lit use is used in a way that an image printed by the ink-jet method is directly observed by a transmitted light from a back light.

15. The ink-jet recording material according to claim 1 or 2, wherein a solid content of the ink-receptive layer per unit area is 10 g/m$^2$ or more.

16. The ink-jet recording material according to claim 1 or 2, wherein a solid content of the ink-receptive layer per unit area is 13 to 35 g/m$^2$.

17. The ink-jet recording material according to claim 1 or 2, wherein the inorganic pigment is present in an amount of 0.1 to 5 g/m$^2$ per a unit area of the recording material.

18. The ink-jet recording material according to claim 2, wherein a weight ratio (A)/(B) of (A) the inorganic fine particles with the secondary average particle diameter of less than 0.5 $\mu$m and (B) the inorganic pigment with an average particle diameter of 0.5 $\mu$m or more is 82/18 to 99/1.

19. The ink-jet recording material according to claim 2, further including a weight ratio (A)/(B) of (A) the inorganic fine particles with the secondary average particle diameter of less than 0.5 $\mu$m and (B) the inorganic pigment with an average particle diameter of 0.5 $\mu$m or more is 90/10 to 98/2.

* * * * *